T. PESCATORE.
SYSTEM OF TRANSPORTING HEAVY LOADS BY MOTOR VEHICLES.
APPLICATION FILED JULY 6, 1911.
1,084,820. Patented Jan. 20, 1914.
Fig. 1.
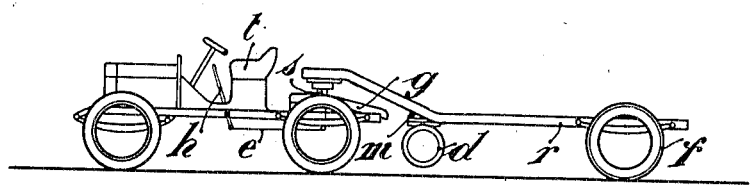
Fig. 2.
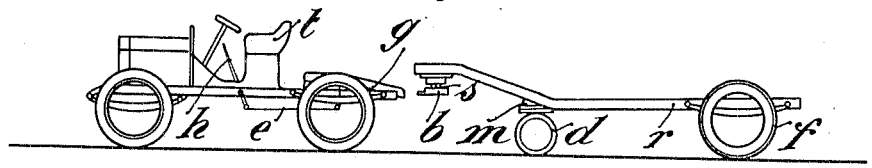
Fig. 3. Fig. 4.
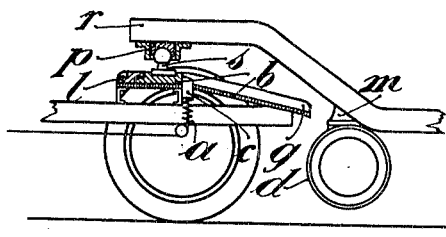 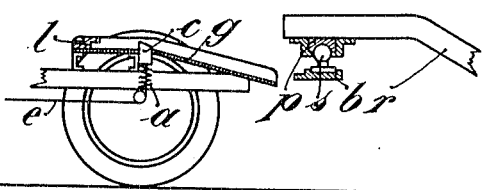

UNITED STATES PATENT OFFICE.

THÉODORE PESCATORE, OF LIEGE, BELGIUM.

SYSTEM OF TRANSPORTING HEAVY LOADS BY MOTOR-VEHICLES.

1,084,820.      Specification of Letters Patent.      Patented Jan. 20, 1914.

Application filed July 6, 1911. Serial No. 637,130.

*To all whom it may concern:*

Be it known that I, THÉODORE PESCATORE, a subject of the Duke of Luxemburg, residing at Liege, Belgium, have invented certain new and useful Improvements in Systems of Transporting Heavy Loads by Motor-Vehicles; and I do hereby declare the following to be a full, clear, and exact description of the invention, such as will enable others skilled in the art to which it appertains to make and use the same.

This invention relates to a system of transporting heavy loads by motor vehicles.

The difficulties which have been met with up to the present in the transport of heavy loads by automobiles consist, chiefly, in the unavoidable smallness of the space available on the platforms of the chassis of these vehicles. Moreover, the employment of rubber tires is rendered unfavorable since these have to serve not only to transmit the propulsive effort, but they must also support the total weight of the goods to be carried. Another inconvenience of the vehicle itself carrying the goods is that it has to remain inactive during the loading and unloading of the goods. In order to obviate these inconveniences the automobile has been used as a tractor, the load being placed upon a separate vehicle drawn by the motor vehicle. The inconvenience of this system is that the load transported is not utilized for insuring the necessary grip or adherence of the wheels of the tractive vehicle upon the ground.

The system which is the object of the present invention also utilizes the motor vehicle as tractor, but it utilizes, in part, the load to be transported for giving to the driving wheels of this tractor the necessary adherence to the ground, the greater part of the said load being, however, supported by the wheels of the trailing vehicle. In this manner the tractor vehicle can be provided with rubber tires without it being necessary to provide for these tires taking the total load. The trailing vehicle, which supports the greater part of the load, can be provided with iron tires, the merchandise not requiring such an elastic suspension as the mechanism of the tractor vehicle. Each tractor can possess several trailers used alternately and capable of being easily coupled to or detached from the said tractor.

The accompanying drawing represents, by way of example, one method of carrying out the invention.

Figure 1 shows the trailing vehicle coupled to the tractor. Fig. 2 shows the two vehicles uncoupled. Fig. 3 represents, on a larger scale, an automatic coupling and uncoupling arrangement in a corresponding position to Fig. 1. Fig. 4 is a corresponding view in the condition shown in Fig. 2.

The object set out above is attained by slightly lifting the front part of the trailing vehicle so that the front wheels leave the ground, and coupling it in this position to the tractor. The front part of the trailing vehicle is thus supported by the tractor and assures the adherence of the driving wheels of the latter to the ground. The application of this system necessitates a special automatic arrangement for coupling and uncoupling the front of the trailing vehicle.

The motor-driven tractor vehicle $t$ is furnished, at the rear part of the chassis, with an inclined plane $g$, provided with guides along its sides. The trailing vehicle $r$ consists of a platform supported at the rear by an axle and two large wheels $f$ having iron tires. At the front, this trailing chassis carries a spherical socket bearing $p$ inclosing a ball $s$ carried by a base or support $b$. Moreover, the trailing vehicle $r$ is supported when it is not coupled to the tractor $t$, by two small wheels $d$ resting on the ground and turning, with reference to the chassis, upon an ordinary swiveling undercarriage $m$. This undercarriage permits of steering the trailer, by hand through the medium of a pole like an ordinary horse-drawn wagon.

When it is desired to draw the wagon $r$, the tractor $t$ is brought in front of the said wagon $r$, as shown in Figs. 2 and 4; it is then propelled backward so that the inclined plane $g$ engages under the support $b$ of the ball $s$; if the backward movement of the tractor $t$ is continued the support $b$ of the ball $s$ slides over the plane $g$, which has the effect of raising the front of the trailing chassis, whose wheels $d$ leave the ground. When the support $b$ arrives at the end of its travel over the plane $g$ it depresses the beveled catches $c$, wipes over the same, and engages in its housing $l$, while the catches $c$ are raised by their springs so as to engage behind the part $b$, thus securing the latter, and completing the coupling of the trailing vehicle (Figs. 1 and 3). The whole equipage is thus ready for starting; the support of the ball joint being rigidly secured to the tractor vehicle and the front wheels of the trailing vehicle being raised from the ground, the load carried by the said trailing vehicle is supported principally by the rear wheels, but in a lesser degree by the tractor chassis, through the medium of the ball joint and its support.

In order to separate the tractor from the trailing vehicle the driver simply operates the lever $h$ which, by means of the cable $e$, compresses the springs $a$ of the catches $c$ which are withdrawn. If the tractor is now started in the forward direction the support $b$ of the ball $s$ will slide over the inclined plane $g$ and the trailing chassis will be lowered so that the front wheels $d$ rest upon the ground, the support $b$ of the ball joint will then have completely left the plane $g$ of the tractor $t$, so that the latter is quite free from the trailing vehicle and can be attached to another.

It is obvious that the system of raising the trailing vehicle and of coupling it to the tractor vehicle, can be modified.

I claim:

1. The combination of a truck having forward and rear wheels, a tractor having independent driving and steering wheels, and means for detachably connecting the tractor and truck adapted to elevate automatically the forward end of the latter to raise the steering wheels thereof from the ground and transfer a portion of the weight of the truck and load to the driving wheels of the tractor.

2. The combination of a truck having forward and rear wheels, a tractor, and means for automatically connecting the tractor and truck to transfer portion of the weight of the latter and its load from the wheels of the truck to the driving wheels of the tractor, said connecting means being engaged by moving the tractor to carry a member thereof beneath one end of the truck.

3. The combination of a wheeled truck, a tractor having a member adapted to be automatically engaged with one end of the truck body by a movement of the tractor toward the truck, said movement acting to lift the engaged end of the truck to raise the adjacent truck wheels from the ground, and means controllable from the tractor for permitting the simultaneous lowering of the elevated end of the truck and disengagement thereof from the tractor by a forward movement of the latter.

4. The combination of a wheeled truck, a tractor having a member adapted to be moved into engagement with the truck and to automatically lift the adjacent truck wheels from the ground, whereby the weight of the truck and its load will be supported by the other truck wheels and the tractor, and means controlled from the tractor for permitting disengagement of the truck and tractor during the forward movement of the latter.

5. The combination of a wheeled truck having a depending pivotal bearing adjacent its forward end, a tractor having a seat for said bearing, and means adapted by the rearward movement of the tractor to raise the forward end of the truck and guide said bearing to the seat therefor on the tractor, and means for automatically securing the truck and tractor together when the bearing is in position on said seat.

6. The combination of a wheeled truck, and a tractor having at one end an upwardly inclined section adapted to be moved beneath and detachably connected with one end of the truck and during such movement to coupling position lift the truck wheels adjacent said engaged end from the ground whereby the weight of the truck and load will be borne by the other truck wheels and the tractor.

In testimony whereof I affix my signature in presence of two witnesses.

THÉODORE PESCATORE.

Witnesses:
H. A. JOHNSON,
A. PENDLETON CRUGER.